(12) United States Patent
Kim

(10) Patent No.: US 8,531,633 B2
(45) Date of Patent: *Sep. 10, 2013

(54) MULTI-DOMAIN LIQUID CRYSTAL DISPLAY AND MANUFACTURING METHOD OF THE SAME

(75) Inventor: Jae-Hoon Kim, Yongin-si (KR)

(73) Assignee: IUCF-HYU (Industry-University Cooperation Foundation Hanyang University), Seoul (KR)

( * ) Notice: Subject to any disclaimer, the term of this patent is extended or adjusted under 35 U.S.C. 154(b) by 415 days.

This patent is subject to a terminal disclaimer.

(21) Appl. No.: 12/722,626

(22) Filed: Mar. 12, 2010

(65) Prior Publication Data

US 2011/0128488 A1    Jun. 2, 2011

(30) Foreign Application Priority Data

Nov. 30, 2009  (KR) .......................... 10-2009-0116639
Mar. 5, 2010   (KR) .......................... 10-2010-0019887

(51) Int. Cl.
 *G02F 1/1337* (2006.01)
(52) U.S. Cl.
 USPC ............................ 349/129; 349/123; 349/125
(58) Field of Classification Search
 USPC .................................. 349/117, 129, 123, 125
 See application file for complete search history.

(56) References Cited

U.S. PATENT DOCUMENTS

| 2007/0024782 | A1* | 2/2007 | Kwok et al. | 349/123 |
| 2008/0123037 | A1* | 5/2008 | Mizuki et al. | 349/125 |
| 2010/0085520 | A1* | 4/2010 | Katayama | 349/114 |

FOREIGN PATENT DOCUMENTS

| KR | 10-1999-0009290 | 2/1999 |
| KR | 10-2002-0080862 | 10/2002 |
| KR | 10-2006-0032705 | 4/2006 |
| KR | 10-0861014 | 9/2008 |

OTHER PUBLICATIONS

Korean Patent and Trademark Office, International Search Report of PCT/KR2010/007194, Jun. 23, 2011, Korea.
You-Jin Lee et al., Fabrication of Fast Switchable Patterned Vertical-Alignment Mode Using Modified Surface with Reactive Mesogen, 2009 International Symposium, Seminar, and Exhibition, May 31-Jun. 5, 2009, TX, USA.
You-Jin Lee et al., Surface-controlled patterned vertical alignment mode with reactive mesogen, Optics Express, vol. 17, No. 12, Jun. 4, 2009, p. 10298-10303.

* cited by examiner

*Primary Examiner* — Phu Vu
(74) *Attorney, Agent, or Firm* — Lexyoume IP Meister, PLLC.

(57) ABSTRACT

According to an exemplary embodiment of the present invention, a liquid crystal layer may be aligned by using an alignment layer including an alignment base layer having a horizontal alignment layer and a vertical alignment layer, and an alignment control agent. Accordingly, a multi-domain liquid crystal display having an excellent viewing angle for all grays may be provided. Also, a multi-domain liquid crystal display having a fast response speed as well as an excellent viewing angle for all grays may be provided.

42 Claims, 17 Drawing Sheets

MULTI-DOMAIN LIQUID CRYSTAL DISPLAY AND MANUFACTURING METHOD OF THE SAME

CROSS-REFERENCE TO RELATED APPLICATION

This application claims priority to and the benefit of Korean Patent Application Nos. 10-2009-0116639 and 1-2010-0019887 filed in the Korean Intellectual Property Office on Nov. 30, 2009 and Mar. 5, 2010, the entire contents of which are incorporated herein by reference.

BACKGROUND OF THE INVENTION (a) Field of the Invention

The present invention relates to a multi-domain liquid crystal display and a manufacturing method thereof.

(b) Description of the Related Art

Among liquid crystal displays, a twisted nematic (TN) mode has high light transmittance efficiency compared with different modes, and the manufacturing process thereof is simple such that it is widely used. However, the viewing angle may be deteriorated at the special direction.

In the liquid crystal display of the twisted nematic mode, to improve the viewing angle, a method using a phase difference film and a method applying multi-alignment using a horizontal alignment layer are used. However, when using the phase difference film, an additional process is required and the product cost is increased. Also, in the method applying the multi-alignment, the pre-tilt polar angle is not high enough under the alignment using the horizontal alignment such that there is a problem that the multi-domain is not formed in the low grays, and the response speed is slow.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a multi-domain liquid crystal display providing an excellent viewing angle and a fast response speed for all grays.

A liquid crystal display according to an exemplary embodiment of the present invention includes: a first substrate; a first horizontal alignment base layer disposed on the first substrate; a first vertical alignment base layer disposed on the first horizontal alignment layer; a first alignment layer including a first alignment control agent extended from the first vertical alignment base layer; a second substrate facing the first substrate; a second horizontal alignment base layer disposed on the second substrate; a second vertical alignment base layer disposed on the second horizontal alignment base layer; and a second alignment layer disposed on the second vertical alignment base layer and including a second alignment control agent extended from the second vertical alignment base layer; and a liquid crystal layer interposed between the first substrate and the second substrate.

The first alignment control agent and the second alignment control agent may be formed by polymerizing a photo-polymerizable monomer or oligomer.

The photo-polymerizable monomer or oligomer may include a reactive mesogen.

The liquid crystal layer may be a twisted nematic liquid crystal layer.

The first alignment layer may include a first region and a second region that are aligned in opposite directions, the second alignment layer may include a third region and a fourth region that are aligned in opposite directions, and the alignment directions of the first region and the second region may be perpendicular to the alignment directions of the third region and the fourth region.

A liquid crystal display according to another exemplary embodiment of the present invention includes: a first substrate; a first alignment base layer disposed on the first substrate and formed by mixing a horizontal alignment material and a vertical alignment material; a first alignment layer including a first alignment control agent extended from the alignment base layer; a second substrate facing the first substrate; a second alignment base layer disposed on the second substrate and including a horizontal alignment material and a vertical alignment material; a second alignment layer disposed on the second alignment base layer and including a second alignment control agent extended from the second alignment base layer; and a liquid crystal layer interposed between the first substrate and the second substrate.

A manufacturing method of a liquid crystal display according to an exemplary embodiment of the present invention includes: depositing a first alignment material layer including a horizontal alignment material, a vertical alignment material, and an alignment control material on a first substrate; aligning the first alignment material to form a first alignment base layer to have a plurality of domains; exposing the first alignment material layer to polymerize the alignment control material thereby forming a first alignment control agent; depositing a second alignment material layer including a horizontal alignment material, a vertical alignment material, and an alignment control material on a second substrate; aligning the second alignment material to form a second alignment base layer to have a plurality of domains; and exposing the second alignment material layer to polymerize the alignment control material thereby forming a second alignment control agent, wherein the first alignment control agent includes a plurality of branches extended from the first alignment base layer, and the second alignment control agent includes a plurality of branches extended from the second alignment base layer.

The method may further include assembling the first substrate including the first alignment base layer and the first alignment control agent and the second substrate including the second alignment base layer and the second alignment control agent to face each other, and injecting a liquid crystal layer between the first substrate and the second substrate.

The forming of the first alignment base layer and the aligning of the second alignment base layer may include rubbing the first alignment material layer and the second alignment material layer.

The forming of the first alignment base layer and the aligning of the second alignment base layer may include light-aligning the first alignment material layer and the second alignment material layer.

A manufacturing method of a liquid crystal display according to another exemplary embodiment of the present invention includes: depositing a first alignment material layer including a horizontal alignment material, a vertical alignment material, and an alignment control material on a first substrate; aligning the first alignment material to form a first alignment base layer to have a plurality of domains; depositing a second alignment material layer including a horizontal alignment material, a vertical alignment material, and an alignment control material on a second substrate; aligning the second alignment material to form a second alignment base layer to have a plurality of domains; assembling the first substrate and the second substrate to face each other; and exposing the first alignment material layer and the second alignment material layer in a state in which an electric field is applied to a liquid crystal layer to form a first alignment control agent disposed on the first alignment base layer and a second alignment control agent disposed on the second alignment base layer, wherein the first alignment control agent includes a plurality of branches extended from the first alignment base layer, and the second alignment control agent includes a plurality of branches extended from the second alignment base layer.

The method may further include assembling the first substrate and the second substrate to face each other, and injecting a liquid crystal layer between the first substrate and the second substrate.

The method may further include injecting a liquid crystal layer between the first substrate and the second substrate after forming the first alignment control agent and the second alignment control agent.

According to an exemplary embodiment of the present invention, a liquid crystal layer may be aligned by using an alignment layer including an alignment base layer having a horizontal alignment layer and a vertical alignment layer, and an alignment control agent. Accordingly, a multi-domain liquid crystal display having a fast response speed as well as an excellent viewing angle over all grays may be provided.

DETAILED DESCRIPTION OF THE EMBODIMENTS

The advantages, features, and aspects of the invention will become apparent from the following description of the embodiments with reference to the accompanying drawings, which is set forth hereinafter. However, the present invention is not limited to exemplary embodiments that are described herein. The present invention may have various embodiments. The exemplary embodiments are provided to clearly show the present invention to those skilled in the art, and the present invention is intended to cover various modifications and equivalent arrangements included within the spirit and scope of the appended claims.

Now, exemplary embodiments of the present invention will be described with reference to the accompanying drawings.

Figure 1A:
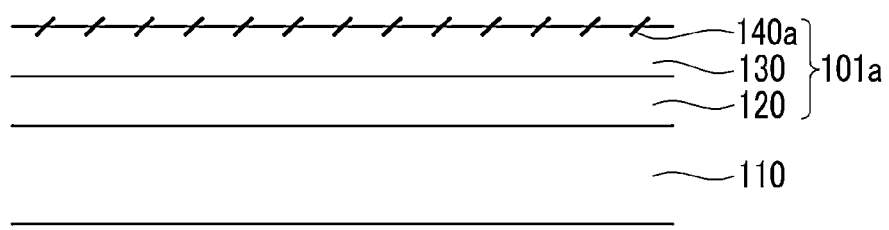
FIG. 1A is a cross-sectional view of a display panel for a liquid crystal display according to an exemplary embodiment of the present invention.

Firstly, a display panel for a liquid crystal display according to an exemplary embodiment of the present invention will be described with reference to FIG. 1A. FIG. 1A is a cross-sectional view of a display panel for a liquid crystal display according to an exemplary embodiment of the present invention.

Referring to FIG. 1A, a display panel for a liquid crystal display according to an exemplary embodiment of the present invention includes an insulating substrate 110 and a first alignment layer 101a disposed on the insulating substrate 110. The first alignment layer 101a includes an alignment base layer including the first alignment base layer 120 disposed on the insulating substrate 110, a second alignment base layer 130 disposed on the first alignment base layer 120, and a first alignment control agent 140a disposed on the second alignment base layer 130. The first alignment control agent 140a includes a plurality of branches extending from the alignment base layers 120 and 130.

Although not shown, signal lines such as a gate line and a data line, a switching element connected to the signal lines such as a thin film transistor (TFT), and a pixel electrode connected to the switching element may be formed between the insulating substrate 110 and the first alignment layer 101a. Also, a color filter, a light blocking member, and a common electrode may be formed between the insulating substrate 110 and the first alignment layer 101a.

The first alignment base layer 120 includes a horizontal alignment material, and the second alignment base layer 130 includes a vertical alignment material. The first alignment base layer 120 and the second alignment base layer 130 may be aligned in a plurality of directions. The first alignment base layer 120 and the second alignment base layer 130 may include at least one of polymer-based materials, for example a polyamic acid, a polyimide, nylon, PVA (polyvinylalcohol), and PVC.

The first alignment control agent 140a is formed by photo-polymerizing the photo-polymerizable monomer or oligomer. As the photo-polymerizable monomer or oligomer, there are a reactive mesogen (RM), NOA series manufactured by Norland, Co., Ltd., and the like. The term "reactive mesogen" (RM) means a polymerizable mesogenic compound. The term "mesogenic material" or "mesogenic compound" includes materials or compounds including one or more rod-shaped, board-shaped, or disk-shaped mesogenic groups, i.e. groups with the ability to induce liquid crystal phase behavior. Liquid crystal compounds with rod-shaped or board-shaped groups are also known in the art as "calamitic" liquid crystals. Liquid crystal compounds with a disk-shaped group are also known in the art as "discotic" liquid crystals. The compounds or materials including mesogenic groups do not necessarily have to exhibit a liquid crystal phase themselves. It is also possible that they show liquid crystal phase behavior only in mixtures with other compounds, or when the mesogenic compounds or materials, or the mixtures thereof, are polymerized.

The reactive mesogen is polymerized by light such as ultraviolet rays, and is a material that is aligned according to an alignment state of the adjacent material. Examples of the reactive mesogen may be a compound that is represented by the following formula.

P1-A1-(Z1-A2)n-P2,

Herein, P1 and P2 are independently selected from acrylate, methacrylate, vinyl, vinyloxy, and epoxy groups, A1 and A2 are independently selected from 1,4-phenylene and naphthalene-2,6-diyl groups, Z1 is any one of COO—, OCO—, and single bonds, and n is any one of 0, 1, and 2.

In more detail, it may be a compound that is represented by any one of the following formulas.

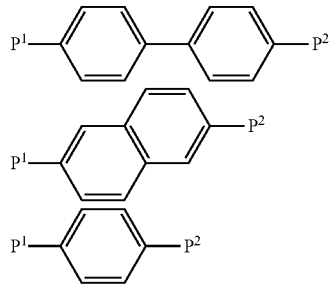

Herein, P1 and P2 are independently selected from acrylate, methacrylate, vinyl, vinyloxy, and epoxy groups.

All alignment layers according to an exemplary embodiment of the present invention are aligned for the liquid crystal molecules disposed thereon to have a predetermined pre-tilt, and in the specification, the pre-tilt may have an angle and a direction that are hereafter respectively defined as a polar angle of 0-180 degrees and a azimuthal angle of 0-360 degrees. That is, the pre-tilt may be interpreted as a mean including both the azimuthal angle of 0-360 degrees and the polar angle of 0-180 degrees. Here, the azimuthal angle means an angle at which the projection on the substrate of the alignment layer or the liquid crystal is inclined with reference to the signal lines of the liquid crystal display, for example the gate lines or the data lines. The polar angle means an angle at which the alignment control agent or the liquid crystal is inclined with reference to a line that is perpendicular to the horizontal surface of the substrate (a normal line of the substrate surface).

The second alignment base layer 130 is coated by mixing a vertical alignment material with a solution in which a solvent, NMP (n-methyl-pyrrolidone), BL (butyrolactone), and BC (butoxyethanol) are mixed in a ratio of about 3:4:3. The thickness of the second alignment base layer 130 may be changed according to the amount (weight percent: wt %) of the vertical alignment layer material.

Generally, the polar angle $\theta_{min}$ of the minimum pre-tilt required to form four stable domains is obtained by the following equation.

$$\theta_{min}^2 = \pi d/L$$

Here, d is a cell interval of a liquid crystal layer, and L is a horizontal size of the domain.

For example, when the cell interval is 5 μm and the horizontal size of the domain is 100 μm, the polar angle $\theta_{min}$ of the minimum pre-tilt required to form four stable domains is about 22°.

Generally, the horizontal alignment layer has a polar angle of about 4-5° and the vertical alignment layer has a polar angle of about 89-90° such that it is difficult to form the four stable domains in the twisted nematic mode.

In the case of the display panel for a liquid crystal display according to an exemplary embodiment of the present invention, the alignment layer 101a includes the first alignment base layer 120 including the horizontal alignment material and the second alignment base layer 130 including the vertical alignment material, thereby realizing a polar angle having a middle value between the polar angles of the horizontal alignment layer and the vertical alignment layer by the combination of the anchoring energy of the first alignment base layer 120 and the second alignment base layer 130. For example, when the thickness of the second alignment base layer 130 is increased compared with the first alignment base layer 120, the polar angle of the pre-tilt is increased; otherwise, the polar angle of the pre-tilt may be decreased.

Accordingly, in the case of the display panel for a liquid crystal display according to an exemplary embodiment of the present invention, the alignment layer 101a includes the first alignment base layer 120 including the horizontal alignment material and the second alignment base layer 130 including the vertical alignment material such that the liquid crystal molecules may be aligned to have the desired polar angle.

Also, the alignment layer 101a includes the first alignment control agent 140a disposed on the first alignment base layer 120 and the second alignment base layer 130. The pre-tilt angle and the direction of the liquid crystal directors may be changed or reinforced by the pre-tilt of the first alignment control agent 140a, and also the response speed of the liquid crystal molecules may be increased.

Figure 1B:
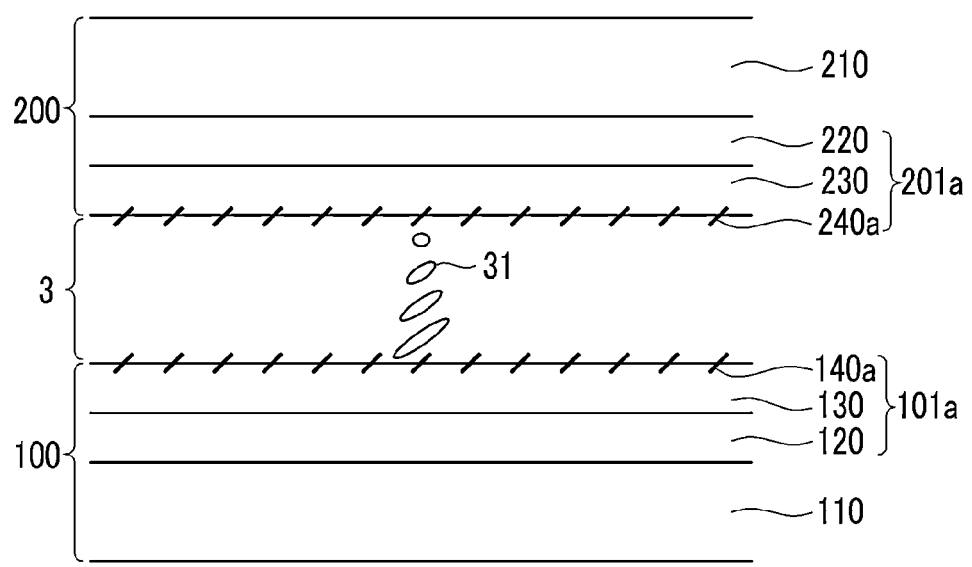
FIG. 1B is a cross-sectional view of a liquid crystal display according to an exemplary embodiment of the present invention.

Next, a liquid crystal display according to an exemplary embodiment of the present invention will be described with reference to FIG. 1B. FIG. 1B is a cross-sectional view of a liquid crystal display according to an exemplary embodiment of the present invention.

Referring to FIG. 1B, a liquid crystal display according to the present exemplary embodiment includes two display panels 100 and 200, and a liquid crystal layer 3 interposed therebetween.

The lower display panel 100 includes the first insulating substrate 110 and the first alignment layer 101a disposed on the first insulating substrate 110. The first alignment layer 101a includes the first alignment base layer 120 disposed on the first insulating substrate 110, the second alignment base layer 130 disposed on the first alignment base layer 120, and the first alignment control agent 140a disposed on the second alignment base layer 130.

The upper display panel 200 includes a second insulating substrate 210 and a second alignment layer 201a disposed on the second insulating substrate 210. The second alignment layer 201a includes a third alignment base layer 220 disposed on the second insulating substrate 210, a fourth alignment base layer 230 disposed on the third alignment base layer 220, and a second alignment control agent 240a disposed on the fourth alignment base layer 230.

The first alignment base layer 120 and the third alignment base layer 220 include the horizontal alignment material, and the second alignment base layer 130 and the fourth alignment base layer 230 include the vertical alignment material. The first alignment base layer 120 and the second alignment base layer 130, and the third alignment base layer 220 and the fourth alignment base layer 230, may be aligned in a plurality of directions. The first alignment control agent 140a and the second alignment control agent 240a are formed by photo-polymerizing the photo-polymerizable monomer or oligomer. The first alignment control agent 140a and the second alignment control agent 240a include a plurality of branches protruding from the alignment base layers 120, 130, 220, and 230. The first alignment base layer 120 and the second alignment base layer 130, the third alignment base layer 220 and the fourth alignment base layer 230, and the first alignment control agent 140a and the second alignment control agent 240a include the same material as the alignment base layer and the alignment control agent described in FIG. 1A.

The first alignment layer 101a of the lower display panel 100 includes at least two of first regions and second regions that are aligned in different directions, and the second alignment layer 201a of the upper display panel 200 includes at least two of third regions and fourth regions that are aligned in different directions.

The first region and the second region of the first alignment layer 101a of the lower display panel 100 may be aligned in opposite directions, and the third region and the fourth region of the second alignment layer 201a of the upper display panel 200 may be aligned in opposite directions.

Also, the alignment directions of the first region and the second region of the lower display panel 100 and the alignment directions of the third region and the fourth region of the upper display panel 200 may be perpendicular to each other.

In the shown exemplary embodiment, both alignment layers 101a and 201a of the lower display panel 100 and the upper display panel 200 include the alignment base layer including the horizontal alignment material and the alignment base layer including the vertical alignment material, however the alignment layer of at least one display panel of the two display panels 100 and 200 may include the alignment base layer including the horizontal alignment material and the alignment base layer including the vertical alignment material. Also, in the shown exemplary embodiment, both the lower display panel 100 and the upper display panel 200 include the alignment control agents 140a and 240a, and at least one display panel of the two display panels 100 and 200 may only include the alignment control agents 140a and 240a.

Although not shown, the signal lines such as the gate line and data line, the switching element such as the thin film transistor (TFT), the pixel electrode connected to the switching element, the color filter, the light blocking member, and the common electrode may be formed on the first substrate 110 or the second substrate 210.

In this way, in the liquid crystal display according to an exemplary embodiment of the present invention, the alignment base layer is formed by depositing the horizontal alignment layer and the vertical alignment layer including the photo-polymerizable monomer or oligomer on the substrate, is aligned in the desired direction, and is then UV-irradiated to polymerize the photo-polymerizable monomer or oligomer thereby forming the alignment layer including the alignment control agent. Thereby, the liquid crystal director is aligned to have the desired pre-tilt direction and polar angle and simultaneously the pre-tilt may be reinforced, and accordingly the multi-domain may be realized at the low grays and the response speed of the liquid crystal molecules may be increased. Accordingly, a liquid crystal display having an excellent viewing angle for all grays may be obtained, and a fast response speed may be realized.

Figure 2A:
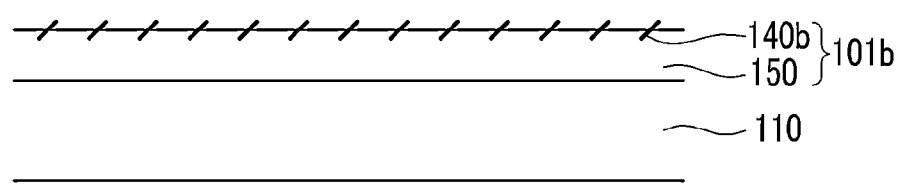
FIG. 2A is a cross-sectional view of a display panel for a liquid crystal display according to another exemplary embodiment of the present invention.
Figure 2B:
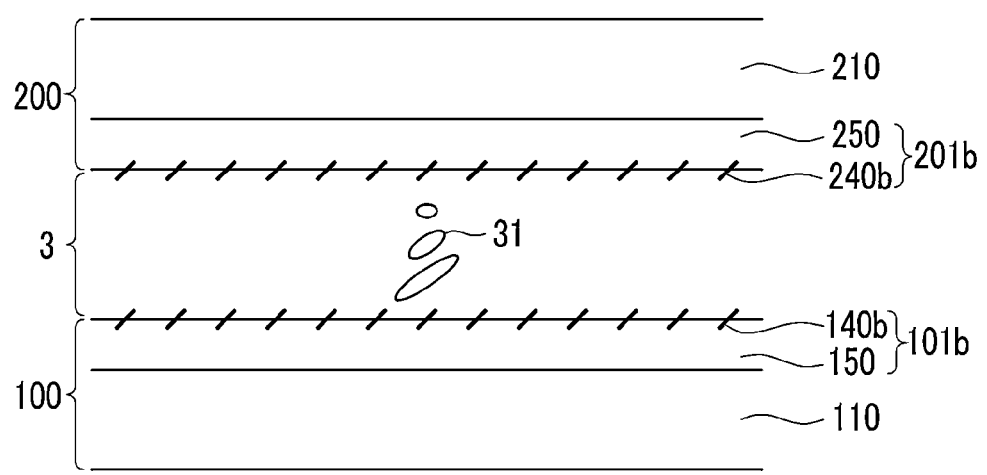
FIG. 2B is a cross-sectional view of a liquid crystal display according to another exemplary embodiment of the present invention.

Next, a display panel for a liquid crystal display and a liquid crystal display according to another exemplary embodiment of the present invention will be described with reference to FIG. 2A and FIG. 2B. FIG. 2A is a cross-sectional view of a display panel for a liquid crystal display according to another exemplary embodiment of the present invention, and FIG. 2B is a cross-sectional view of a liquid crystal display according to the present exemplary embodiment of the present invention.

Referring to FIG. 2A, a display panel for a liquid crystal display according to an exemplary embodiment of the present invention includes an insulating substrate 110 and the third alignment layer 101b disposed on the insulating substrate 110. The third alignment layer 101b includes a fifth alignment base layer 150 of which a horizontal alignment material and a vertical alignment material are mixed, and a third alignment control agent 140b disposed on the fifth alignment base layer 150. The third alignment control agent 140b includes a plurality of branches protruding from the fifth alignment base layer 150.

Although not shown, the signal lines such as the gate line and data line, the switching element connected to the signal lines such as the thin film transistor (TFT), and the pixel electrode connected to the switching element may be formed between the insulating substrate 110 and the third alignment layer 101b. Also, the color filter, the light blocking member, and the common electrode may be formed between the insulating substrate 110 and the third alignment layer 101b.

The fifth alignment base layer 150 is aligned in a plurality of directions, and may include at least one of the materials such as PI, nylon, PVC, and PVA. The fifth alignment base layer 150 may be formed by mixing the vertical alignment material with a solution in which the solvent, NMP (n-methyl-pyrrolidone), BL (butyrolactone), and BC (butoxyethanol) are mixed in a ratio of 3:4:3 and mixing it with the horizontal alignment layer. The polar angle of the pre-tilt by the fifth alignment base layer 140 is changed according to the amount (weight percent: wt %) of the vertical alignment layer material.

As described above, the horizontal alignment layer has a polar angle of about 4-5° and the vertical alignment layer has a polar angle of about 89-90° such that it is difficult to form the four stable domains in the twisted nematic mode.

In the case of the display panel for a liquid crystal display according to an exemplary embodiment of the present invention, the fifth alignment base layer 150 includes the horizontal alignment material and the vertical alignment material thereby realizing the polar angle having the middle value between the polar angles of the horizontal alignment layer and the vertical alignment layer by the combination of the anchoring energy of the horizontal alignment layer and the vertical alignment layer.

Also, the alignment layer 101b includes the third alignment control agent 140b disposed on the fifth alignment base layer 150 thereby reinforcing the pre-tilt angle and the direction of the liquid crystal directors such that the response speed of the liquid crystal molecules may be increased. The third alignment control agent 140b may include the same material as the alignment control agent described with reference to FIG. 1A.

Next, a liquid crystal display according to an exemplary embodiment of the present invention will be described with reference to FIG. 2B.

Referring to FIG. 2B, a liquid crystal display according to the present exemplary embodiment includes two display panels 100 and 200, and a liquid crystal layer 3 interposed therebetween.

The lower display panel 100 includes the first insulating substrate 110 and the third alignment layer 101b disposed on the first insulating substrate 110. The third alignment layer 101b includes the fifth alignment base layer 150 and the third alignment control agent 140b disposed on the fifth alignment base layer 150.

The upper display panel 200 includes the second insulating substrate 210 and a fourth alignment layer 201b disposed on the second insulating substrate 210. The fourth alignment layer 201b includes a sixth alignment base layer 250 and a fourth alignment control agent 240b disposed on the sixth alignment base layer 250.

The fifth alignment base layer 150 and the sixth alignment base layer 250 may be mixed with the horizontal alignment material and the vertical alignment material, and the fifth alignment base layer 150 and the sixth alignment base layer 250 may be aligned in a plurality of directions. The third alignment control agent 140b and the fourth alignment control agent 240b are formed by photo-polymerizing the photopolymerizable monomer or oligomer. The third alignment control agent 140b and the fourth alignment control agent 240b include a plurality of branches protruding from the fifth alignment base layer 150 and the sixth alignment base layer 250.

The fifth alignment base layer 150 and the sixth alignment base layer 250, and the third alignment control agent 140b and the fourth alignment control agent 240b, include the same material as the alignment base layer and the alignment control agent described in FIG. 1A.

The first alignment layer 101a of the lower display panel 100 includes at least two of first regions and second regions that are aligned in different directions, and the second alignment layer 201a of the upper display panel 200 includes at least two of third regions and fourth regions that are aligned in different directions.

The first region and the second region of the first alignment layer 101a of the lower display panel 100 may be aligned in opposite directions, and the third region and the fourth region of the second alignment layer 201a of the upper display panel 200 may be aligned in opposite directions.

Also, the alignment directions of the first region and the second region of the lower display panel 100 and the alignment directions of the third region and the fourth region of the upper display panel 200 may be perpendicular to each other.

In the shown exemplary embodiment, both alignment layers 101b and 201b of the lower display panel 100 and the upper display panel 200 include the mixture base layer including the horizontal alignment material and the vertical alignment material, however only the alignment layer of at least one display panel of the two display panels 100 and 200 may include the mixture base layer including the horizontal alignment material and the vertical alignment material. Also, in the shown exemplary embodiment, the lower display panel 100 and the upper display panel 200 both include the alignment control agents 140b and 240b, however only at least one display panel of the display panels 100 and 200 may include the alignment control agent 140b and 240b.

Although not shown, the signal lines such as the gate line and the data line, the switching element such as the thin film transistor (TFT), the pixel electrode connected to the switching element, the color filter, the light blocking member, and the common electrode may be formed on the first substrate 110 or the second substrate 210.

In the case of the display panel for a liquid crystal display according to an exemplary embodiment of the present invention, the fifth alignment base layer 150 and the sixth alignment base layer 250 in which the horizontal alignment material and the vertical alignment material are mixed are included, thereby realizing the pre-tilt polar angle having the middle value between the pre-tilt polar angles of the horizontal alignment layer and the vertical alignment layer by the combination of the anchoring energy of the horizontal alignment layer and the vertical alignment layer.

Also, the alignment layers 101b and 201b include the third alignment control agent 140b and the fourth alignment control agent 240b disposed on the fifth alignment base layer 150 and the sixth alignment base layer 250, and thereby the pre-tilt angle and the direction of the liquid crystal directors may be changed by the pre-tilt of the alignment control agents 140b and 240b and the response speed of the liquid crystal molecules may be increased.

Figure 3A:
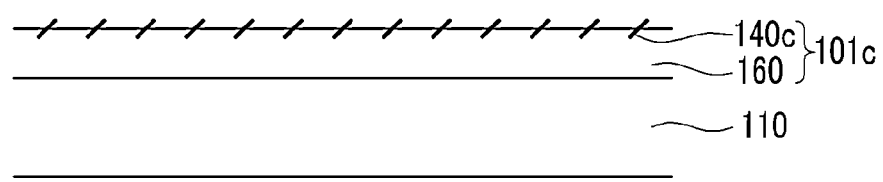
FIG. 3A is a cross-sectional view of a display panel for a liquid crystal display according to another exemplary embodiment of the present invention.
Figure 3B:
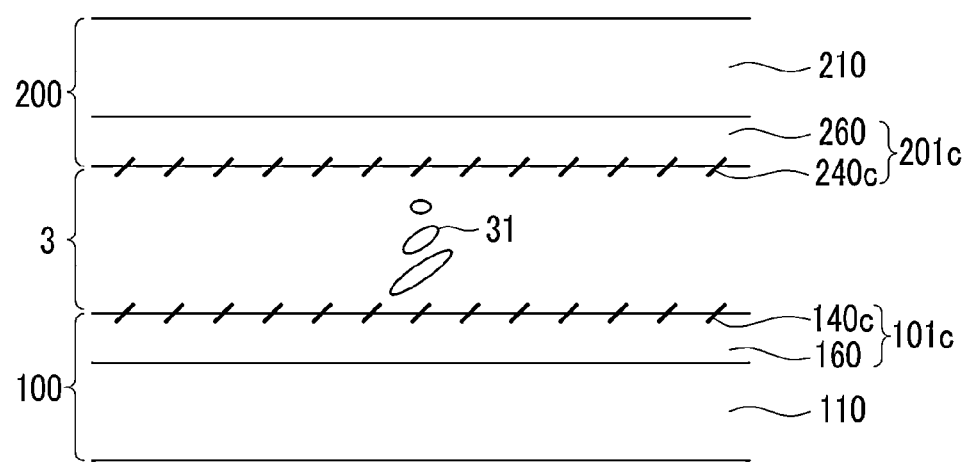
FIG. 3B is a cross-sectional view of a liquid crystal display according to another exemplary embodiment of the present invention.

Next, a display panel for a liquid crystal display and a liquid crystal display according to another exemplary embodiment of the present invention will be described with reference to FIG. 3A and FIG. 3B. FIG. 3A is a cross-sectional view of a display panel for a liquid crystal display according to another exemplary embodiment of the present invention, and FIG. 3B is a cross-sectional view of a liquid crystal display according to the present exemplary embodiment of the present invention.

Referring to FIG. 3A, a display panel for a liquid crystal display according to an exemplary embodiment of the present invention includes an insulating substrate 110 and a fifth alignment layer 101c disposed on the insulating substrate 110. The fifth alignment layer 101c includes a seventh alignment base layer 160 and a fifth alignment control agent 140c disposed on the seventh alignment base layer 160. The seventh alignment base layer 160 may be the horizontal alignment layer, and the seventh alignment base layer 160 may be aligned in the plurality of directions and may include at least one of the materials such as nylon, PVC, and PVA. The fifth alignment control agent 140c includes a plurality of branches protruding from the seventh alignment base layer 160.

The seventh alignment base layer 160 and the fifth alignment control agent 140c may include the same material as the alignment base layer and the alignment control agent described with reference to FIG. 1A.

Although not shown, the signal lines such as the gate line and the data line, the switching element connected to the signal lines such as the thin film transistor (TFT), and the pixel electrode connected to the switching element may be formed between the insulating substrate 110 and the fifth alignment layer 101c. Also, the color filter, the light blocking member, and the common electrode may be formed between the insulating substrate 110 and the fifth alignment layer 101c.

Next, a liquid crystal display according to an exemplary embodiment of the present invention will be described with reference to FIG. 3B.

Referring to FIG. 3B, a liquid crystal display according to the present exemplary embodiment includes two display panels 100 and 200, and a liquid crystal layer 3 interposed therebetween.

The lower display panel 100 includes the first insulating substrate 110 and the fifth alignment layer 101c disposed on the first insulating substrate 110. The fifth alignment layer 101c includes the seventh alignment base layer 160 and the fifth alignment control agent 140c, and includes a plurality of branches protruding from the seventh alignment base layer 160.

The upper display panel 200 includes the second insulating substrate 210 and the sixth alignment layer 201c disposed on the second substrate 210. The sixth alignment layer 201c includes an eighth alignment base layer 260 disposed on the second insulating substrate 210 and a sixth alignment control agent 240c disposed on the eighth alignment base layer 260.

The seventh alignment base layer 160 and the eighth alignment base layer 260 include the horizontal alignment material, and the seventh alignment base layer 160 and the eighth alignment base layer 260 may be aligned in the plurality of directions. The fifth alignment control agent 140c and the sixth alignment control agent 240c are formed by photo-polymerizing the photo-polymerizable monomer or oligomer. The fifth alignment control agent 140c and the sixth alignment control agent 240c include a plurality of branches protruding from the seventh alignment base layer 160 and the eighth alignment base layer 260.

The seventh alignment base layer 160 and the eighth alignment base layer 260, and the fifth alignment control agent 140c and the sixth alignment control agent 240c, may include the same material as the alignment base layer and the alignment control agent of FIG. 1A.

The first alignment layer 101c of the lower display panel 100 includes at least two of first regions and second regions that are aligned in the different directions, and the second alignment layer 201c of the upper display panel 200 includes at least two of third regions and fourth regions that are aligned in the different directions.

The first region and the second region of the first alignment layer 101c of the lower display panel 100 may be aligned in opposite directions, and the third region and the fourth region of the second alignment layer 201c of the upper display panel 200 may be aligned in opposite directions.

Also, the alignment directions of the first region and the second region of the lower display panel 100 and the alignment directions of the third region and the fourth region of the upper display panel 200 may be perpendicular to each other.

Also, in the shown exemplary embodiment, the lower display panel 100 and the upper display panel 200 both include the alignment control agents 140c and 240c, however only at least one display panel of the display panels 100 and 200 may include the alignment control agent 140c and 240c.

Although not shown, the signal lines such as the gate line and the data line, the switching element such as the thin film transistor (TFT), the pixel electrode connected to the switching element, the color filter, the light blocking member, and the common electrode may be formed on the first substrate 110 or the second substrate 210.

Also, the alignment layers 101c and 201c include the fifth alignment control agent 140c and the sixth alignment control agent 240c disposed on the seventh alignment base layer 160 and the eighth alignment base layer 260, and thereby the pre-tilt angle and the direction of the liquid crystal directors may be changed by the pre-tilt of the alignment control agents 140c and 240c and the response speed of the liquid crystal molecules may be fast.

In the above described exemplary embodiment, the liquid crystal layer 3 may include the twisted nematic (TN) liquid crystal molecules. However, the liquid crystal layer 3 may include vertical alignment (VA) liquid crystal molecules.

Figure 4A:
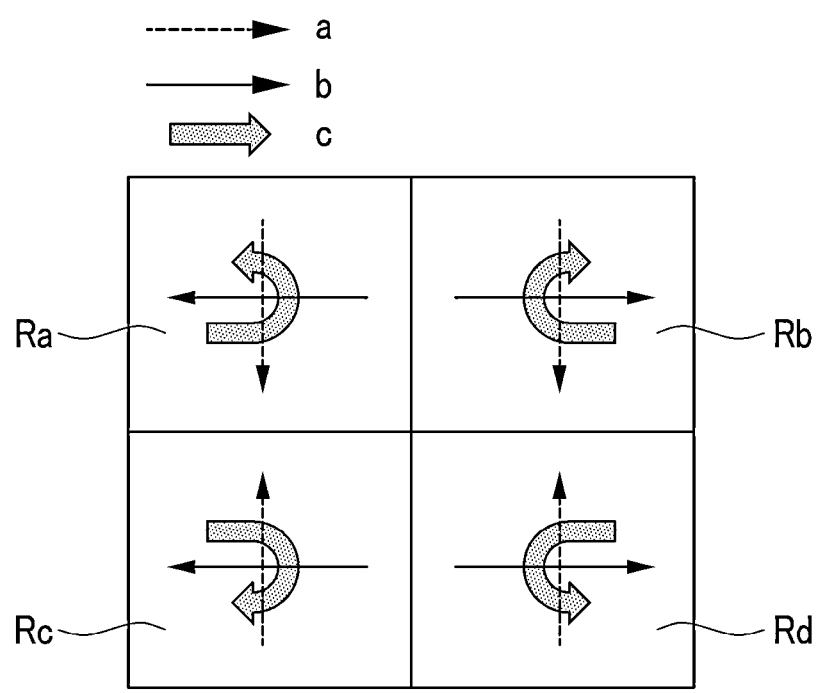
FIG. 4A and FIG. 4B are views conceptually showing a method forming a multi-domain of a liquid crystal display according to an exemplary embodiment of the present invention.
Figure 4B:
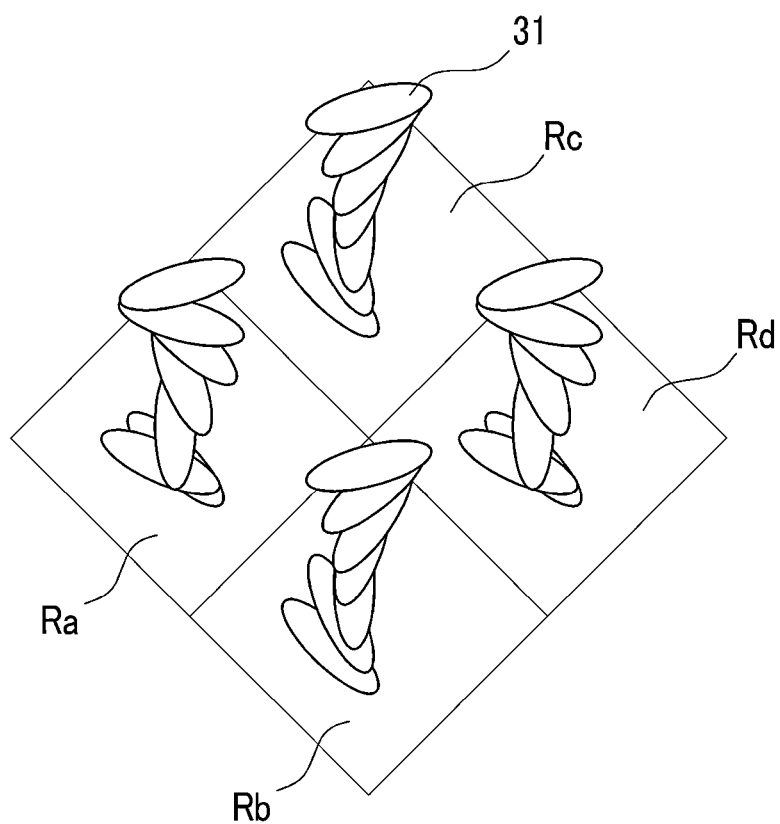

Next, a method for forming a multi-domain of a liquid crystal display according to an exemplary embodiment of the present invention will be described with reference to FIG. 4A and FIG. 4B. FIG. 4A and FIG. 4B are views conceptually showing a method of forming a multi-domain of a liquid crystal display according to an exemplary embodiment of the present invention. FIG. 4A is a view conceptually showing an alignment direction of an alignment layer, and FIG. 4B is a view conceptually showing an arrangement of a liquid crystal director according to the alignment of FIG. 4A.

In FIG. 4A, "a" indicates an alignment direction of a lower display panel 100, b indicates a alignment direction of an upper display panel 200, and "c" indicates an arrangement direction of the liquid crystal director.

Referring to FIG. 4A, the alignment layers of the lower panel 100 are aligned in the opposite directions such that they are divided into the first sub-regions Ra and Rb aligned in the first direction and the second sub-regions Rc and Rd aligned in the second direction. Here, the alignment layers of the lower display panel 100 may have one of the several alignments of the previous exemplary embodiments.

The alignment layers of the upper display panel 200 are aligned in the opposite directions such that they are divided into the third sub-regions Ra and Rb aligned in the third direction and the fourth sub-regions Rc and Rd aligned in the fourth direction. Here, the alignment layers of the upper display panel 200 may have one of the several alignments of the previous exemplary embodiments.

Next, the lower display panel 100 and the upper display panel 200 are combined, thereby forming four regions Ra, Rb, Rc, and Rd such that the liquid crystal molecules 31 are aligned in the different directions, as shown in FIG. 4B. In this way, four domains having different alignment directions are formed thereby increasing the viewing angle. Here, the liquid crystal display according to an exemplary embodiment of the present invention uses the alignment layer including the horizontal alignment layer and the vertical alignment layer such that the liquid crystal molecules may be aligned to have the desired pre-tilt polar angle.

Figure 5:
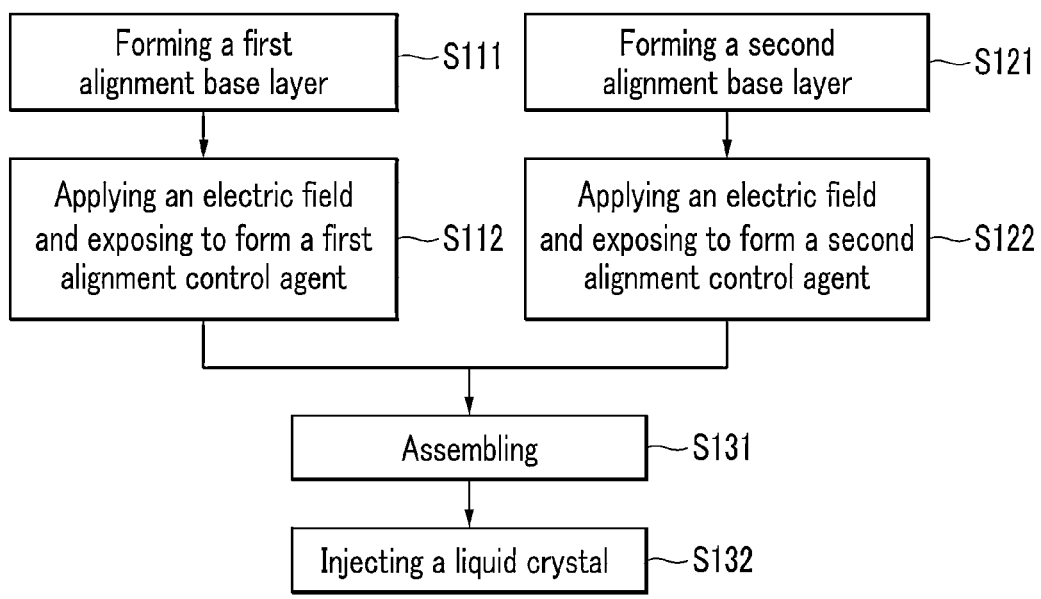
FIG. 5 is a flowchart showing a manufacturing method of a liquid crystal display according to an exemplary embodiment of the present invention.

Next, a manufacturing method of a liquid crystal display according to an exemplary embodiment of the present invention will be described with reference to FIG. 5. FIG. 5 is a flowchart showing a manufacturing method of a liquid crystal display according to an exemplary embodiment of the present invention.

Referring to FIG. 5, the first alignment material layer including the horizontal alignment material, the vertical alignment material, and an alignment control material such as a photo-polymerizable monomer or oligomer is deposited on the first substrate, and aligned in a plurality of desired directions to form the first alignment base layer (S111). In detail, the horizontal alignment material layer is deposited, and the vertical alignment material layer in which the vertical alignment material and the alignment control material such as the photo-polymerizable monomer or oligomer are mixed is deposited thereon, and then rubbed to have the pre-tilt. Here, after depositing the horizontal alignment material layer and providing the pre-tilt through the alignment, the vertical alignment material layer may be deposited.

In the liquid crystal display according to the present exemplary embodiment, the first alignment base layer includes the horizontal alignment material and the vertical alignment material such that the polar angle having the middle value between the polar angles of the horizontal alignment layer and the vertical alignment layer by the combination of the anchoring energy of the horizontal alignment base layer and the vertical alignment base layer may be realized.

Next, in the state in which an electric field is applied to the alignment material layer, the first alignment base layer is exposed to polymerize the alignment control material to form the first alignment control agent (S112). The first alignment control agent may include a plurality of branches extended from the first alignment base layer.

The applying of the electric field to the alignment layer may be performed by using two electrodes that are previously formed on the substrates, or by using a separate apparatus. Accordingly, the application of the electric field may be separately executed for each substrate before assembling the upper and lower substrates Also, a solvent can be added to the alignment layer before applying the electric field. In a more detailed example, the solvent can be sprayed on the layer, or can be injected into the space between the first substrate and the second substrate after the first substrate and the second substrate on which the alignment layer is formed are coupled to each other. If the solvent is added, the viscosity of the alignment layer is decreased such that the photo-polymerizable monomer and oligomer may be further effectively arranged by the electric field. Here, the solvent can be, for example, propylene glycol methyl ether acetate (PGMEA) or an aromatic solvent such as toluene and xylene. After the photo-polymerizable monomer or oligomer is rearranged by applying the electric field, the solvent can be removed by performing a vacuum removing process, a heating process, or an air drying process.

On the other hand, the second alignment material layer including the horizontal alignment material, the vertical alignment material, and an alignment control material such as a photo-polymerizable monomer or oligomer is deposited on the second substrate, and aligned in a plurality of desired directions to form the second alignment base layer (S121). In detail, the horizontal alignment material layer is deposited, and the vertical alignment material layer in which the vertical alignment material and the alignment control material such as the photo-polymerizable monomer or oligomer are mixed is deposited thereon, and then rubbed to have the pre-tilt. Here, after depositing the horizontal alignment material layer and providing the pre-tilt through the alignment, the vertical alignment material layer may be deposited.

Next, in the state in which an electric field is applied to the alignment material layer, the second alignment base layer is exposed to polymerize the alignment control material to form the second alignment control agent (S122). The second alignment control agent may include a plurality of branches extended from the second alignment base layer.

Next, the first substrate and the second substrate are assembled to face each other (S131), and a liquid crystal layer is injected between the first substrate and the second substrate (S132). Also, the liquid crystal layer may be dripped on the first substrate or the second substrate, and then the first substrate and the second substrate may be assembled to face each other.

According to the manufacturing method of the liquid crystal display according to the present exemplary embodiment, the alignment layer includes the horizontal alignment material and the vertical alignment material such that the polar angle having the middle value between the polar angles of the horizontal alignment layer and the vertical alignment layer by the combination of the anchoring energy of the horizontal alignment base layer and the vertical alignment base layer may be realized.

Also, the alignment layer has the alignment control agent including the alignment control material such that the pre-tilt direction and angle of the liquid crystal molecules in the liquid crystal layer may be further reinforced.

Figure 6:
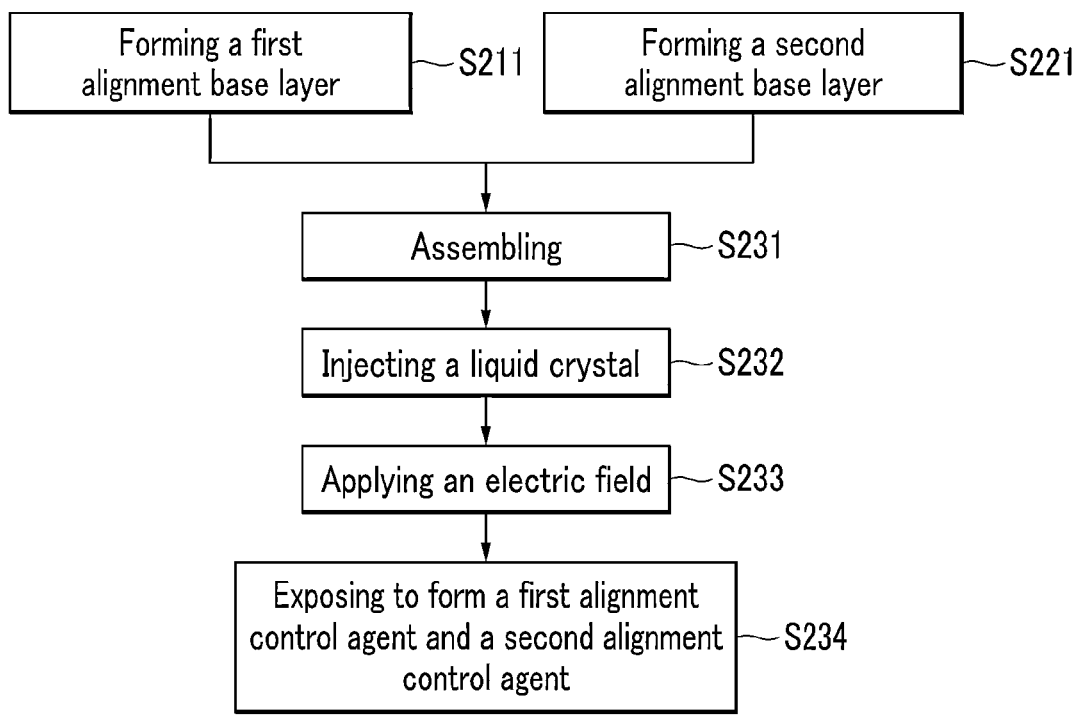
FIG. 6 is a flowchart showing a manufacturing method of a liquid crystal display according to another exemplary embodiment of the present invention.

Next, a manufacturing method of a liquid crystal display according to another exemplary embodiment of the present invention will be described with reference to FIG. 6. FIG. 6 is a flowchart showing a manufacturing method of a liquid crystal display according to another exemplary embodiment of the present invention.

Referring to FIG. 6, the first alignment material layer including the horizontal alignment material, the vertical alignment material, and an alignment control material such as a photo-polymerizable monomer or oligomer is deposited on the first substrate, and aligned in a plurality of desired directions to form the first alignment base layer (S211). In detail, the horizontal alignment material layer is deposited, and the vertical alignment material layer in which the vertical alignment material and the alignment control material such as a photo-polymerizable monomer or oligomer are mixed is deposited thereon, and then rubbed to have the pre-tilt. Here, after depositing the horizontal alignment material layer and providing the pre-tilt through the alignment, the vertical alignment material layer may be deposited.

On the other hand, the second alignment material layer including the horizontal alignment material, the vertical alignment material, and an alignment control material such as a photo-polymerizable monomer or oligomer is deposited on the second substrate, and aligned in a plurality of desired directions to form the second alignment base layer (S221).

Next, the first substrate and the second substrate are assembled to face each other (S231), and a liquid crystal layer is injected between the first substrate and the second substrate (S232). Also, the liquid crystal layer may be dripped on the first substrate or the second substrate, and then the first substrate and the second substrate may be assembled to face each other.

The liquid crystal molecules of the injected liquid crystal layer are arranged according to the pre-tilt characteristic of the first alignment base layer and the second alignment base layer. Here, the photo-polymerizable monomer or oligomer may be added to the liquid crystal layer and the liquid crystal layer may be injected.

Next, the electric field is applied to the liquid crystal layer injected between the first substrate and the second substrate (S233), and is exposed in that state to polymerize the alignment control material included in the first alignment base layer and the second alignment base layer, thereby forming the first alignment control agent and the second alignment control agent (S234). Here, the first alignment control agent may include a plurality of branches extended from the first alignment base layer, and the second alignment control agent may include a plurality of branches extended from the second alignment base layer.

The change of the alignment of the liquid crystal according to the application of the electric field is performed according to the dielectric anisotropy of the liquid crystal, and in the case of liquid crystal having positive dielectric anisotropy, it is sloped in a direction that is parallel to the electric field, and in the case of liquid crystal having negative dielectric anisotropy, it is sloped in a direction that is perpendicular to the electric field. In addition, the degree of change of the alignment of the liquid crystal may vary according to the intensity of the electric field.

According to the manufacturing method of the liquid crystal display according to the present exemplary embodiment, the alignment layer includes the horizontal alignment material and the vertical alignment material such that the polar angle having the middle value between the polar angles of the horizontal alignment layer and the vertical alignment layer by the combination of the anchoring energy of the horizontal alignment base layer and the vertical alignment base layer may be realized.

Also, like the present exemplary embodiment, after injecting the liquid crystal layer, if the first alignment control agent and the second alignment control agent are formed, a plurality of branches extended from the alignment base layer and the alignment control material may be arrange in the arrangement direction of the liquid crystal layer by the arrangement direction of the liquid crystal layer, and are polymerized in the arrangement direction of the liquid crystal layer such that even after the applied first electric field is eliminated, the arrangement is maintained and affects the alignment of the neighboring liquid crystal. Accordingly, the pre-tilt direction in which the liquid crystal molecules of the liquid crystal layer are arranged may be further reinforced.

Also, if the predetermined voltage is applied between the first substrate and the second substrate, by the dielectric anisotropy of the alignment control material such as the photo-polymerizable monomer or oligomer included in the first alignment material layer and the second alignment material layer, the plurality of branches protruded from the alignment base layers and the alignment control material react to the electric field, and may be arranged according to the arrangement of the liquid crystal layer, and accordingly the pre-tilt direction may be further reinforced.

Figure 7:
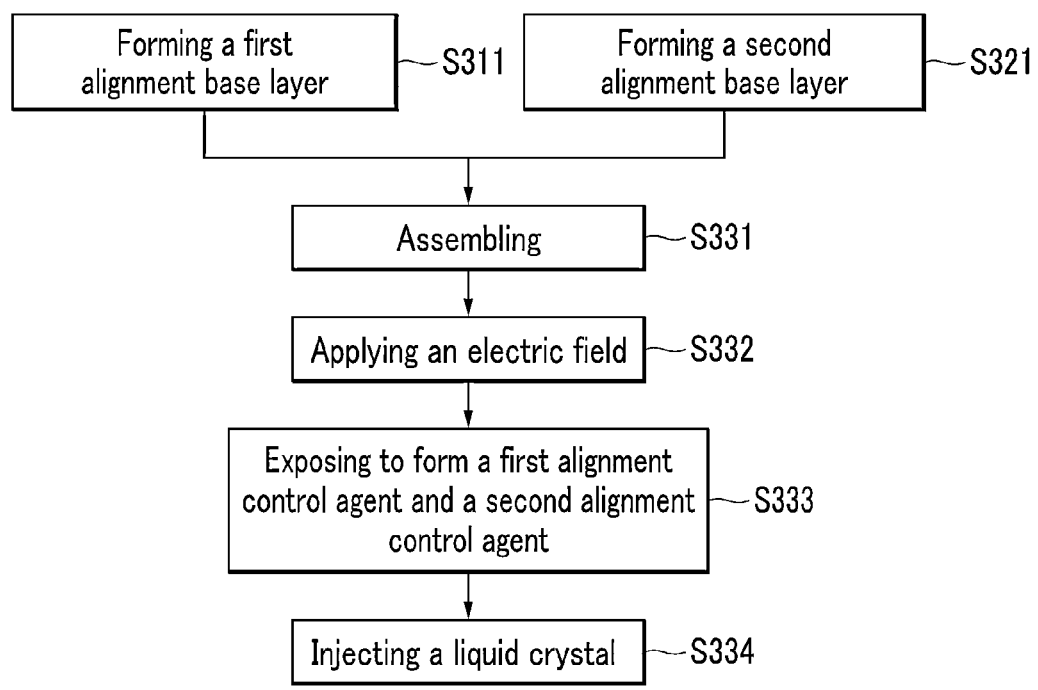
FIG. 7 is a flowchart explaining a manufacturing method of a liquid crystal display according to another exemplary embodiment of the present invention.

Next, a manufacturing method of a liquid crystal display according to another exemplary embodiment of the present invention will be described with reference to FIG. 7. FIG. 7 is a flowchart showing a manufacturing method of a liquid crystal display according to another exemplary embodiment of the present invention.

Referring to FIG. 7, the first alignment material layer including the horizontal alignment material, the vertical alignment material, and an alignment control material such as a photo-polymerizable monomer or oligomer is deposited on the first substrate, and aligned in a plurality of desired directions to form the first alignment base layer (S311). In detail, the horizontal alignment material layer is deposited, and the vertical alignment material layer in which the vertical alignment material and the alignment control material such as the photo-polymerizable monomer or oligomer are mixed is deposited thereon. Here, after depositing the horizontal alignment material layer and providing the pre-tilt through the alignment, the vertical alignment material layer may be deposited.

On the other hand, the second alignment material layer including the horizontal alignment material, the vertical alignment material, and an alignment control material such as a photo-polymerizable monomer or oligomer is deposited on the second substrate, and aligned in a plurality of desired directions to form the second alignment base layer (S321).

The first substrate and the second substrate are assembled to face each other (S331), the electric field is applied between the first substrate and the second substrate (S332), and the alignment control material included in the first alignment base layer and the second alignment base layer is exposed to be polymerized, thereby forming the first alignment control agent and the second alignment control agent (S333). Here, the first alignment control agent may include a plurality of branches extended from the first alignment base layer, and the second alignment control agent may include a plurality of branches extended from the second alignment base layer.

If the predetermined voltage is applied between the first substrate and the second substrate, by the dielectric anisotropy of the alignment control material such as the photo-polymerizable monomer or oligomer included in the first alignment material layer and the second alignment material layer, the plurality of branches protruded from the alignment base layers and the alignment control material are reacted by the electric field, and may be arranged in the predetermined direction according to the direction of the electric field, and accordingly the pre-tilt direction may be further reinforced. In this way, the alignment control material reacts to the electric field and is polymerized in the arranged direction such that even after the applied first electric field is eliminated, the arrangement is maintained and affects the alignment of the neighboring liquid crystal. Accordingly, the pre-tilt direction in which the liquid crystal molecules of the liquid crystal layer are arranged may be further reinforced.

Next, the liquid crystal layer is injected between the first substrate and the second substrate (S334).

Figure 8:
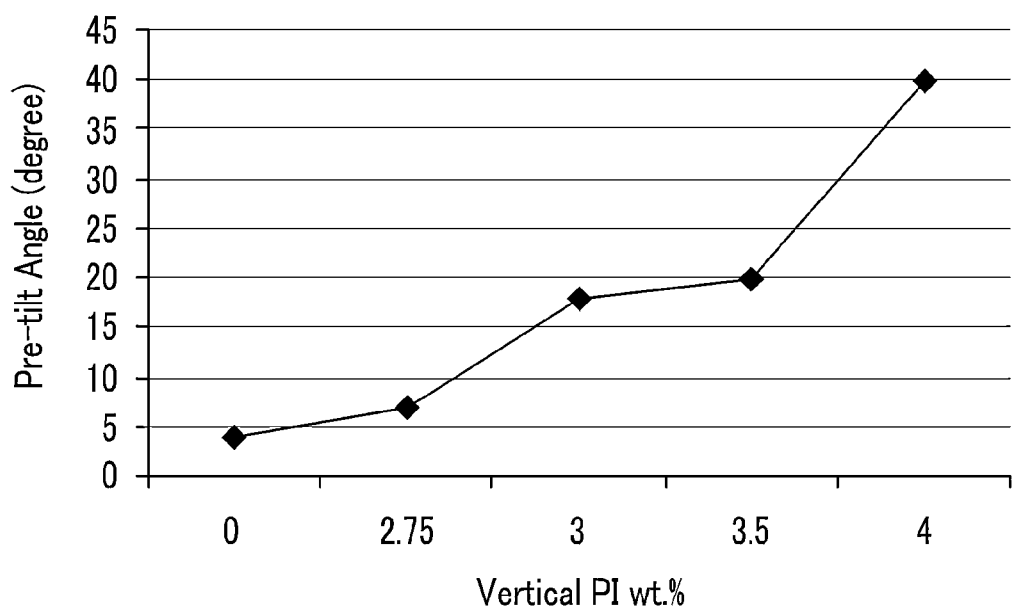
FIG. 8 is a graph showing a result of a pre-tilt of double alignment layers of a liquid crystal display according to an experimental example of the present invention.

Next, a pre-tilt result of double alignment layers of a liquid crystal display according to an experimental example of the present invention will be described with reference to FIG. 8. FIG. 8 is a graph showing results of pre-tilt of double alignment layers of a liquid crystal display according to an experimental example of the present invention.

Referring to FIG. 8, in the alignment layer including the horizontal alignment layer and the vertical alignment layer according to an exemplary embodiment of the present invention, the polar angle of the pre-tilt is increased as the amount (wt %) of the vertical alignment layer is increased. Accordingly, in the case of using the alignment layer including the horizontal alignment layer and the vertical alignment layer according to an exemplary embodiment of the present invention, by controlling the amount of the vertical alignment layer, the liquid crystal molecules may be aligned to have the desired polar angle of the pre-tilt.

Figure 9:
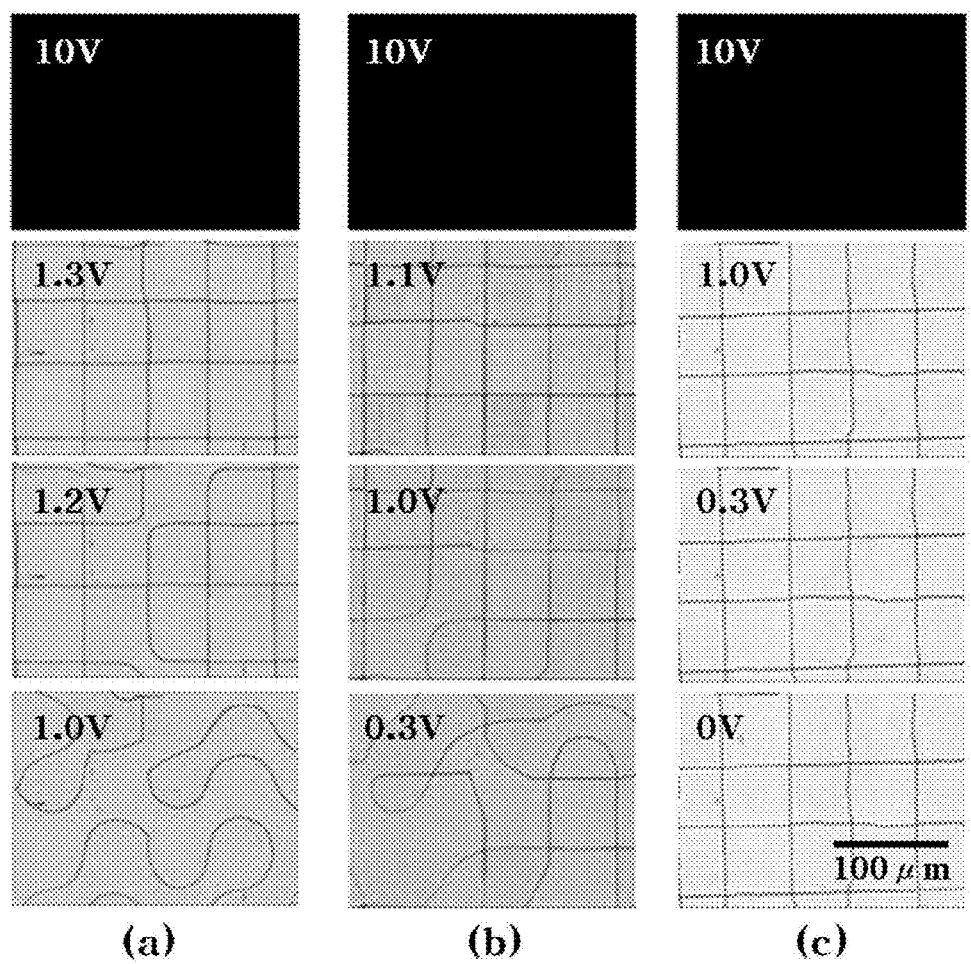
FIG. 9 is a graph showing an estimation result of domain stability of a liquid crystal display according to an experimental example of the present invention.

Next, domain stability of a liquid crystal display according to an experimental example of the present invention will be described with reference to FIG. 9. FIG. 9 is a graph showing an estimating result of domain stability of a liquid crystal display according to an experimental example of the present invention. A solid line shown in each view in FIG. 9 indicates a domain boundary. FIG. 9(a) is the case that the polar angle of the pre-tilt is 4°, FIG. 9(b) is the case that the polar angle of the pre-tilt is 7°, and FIG. 9(c) is the case that the polar angle of the pre-tilt is 18°.

Referring to FIG. 9(a), when the liquid crystal molecules aligned by the alignment layer have the polar angle of the pre-tilt of 4°, it may be confirmed that the stability of the four domains is deteriorated in the low gray range when the liquid crystal layer is applied with the voltage of about 1.2V, and referring to FIG. 9(b), when the liquid crystal molecules have the polar angle of the pre-tilt of 7°, it may be confirmed that the stability of the four domains is deteriorated in the low gray range when the liquid crystal layer is applied with the voltage of about 1.0V. Referring to FIG. 9(c), when the liquid crystal molecules aligned by the alignment layer have the polar angle of the pre-tilt of 18°, it may be confirmed that the four multi-domains are stable at the low voltage of 0V. That is, when the polar angle of the pre-tilt is less than 18°, the multi-domains are not formed at the low voltage. Accordingly, in the display panel for a liquid crystal display according to the present exemplary embodiment, the polar angle of the pre-tilt is controlled by using the alignment layer including the horizontal alignment layer and the vertical alignment layer such that the stable multi-domain may be realized.

Figure 10A:
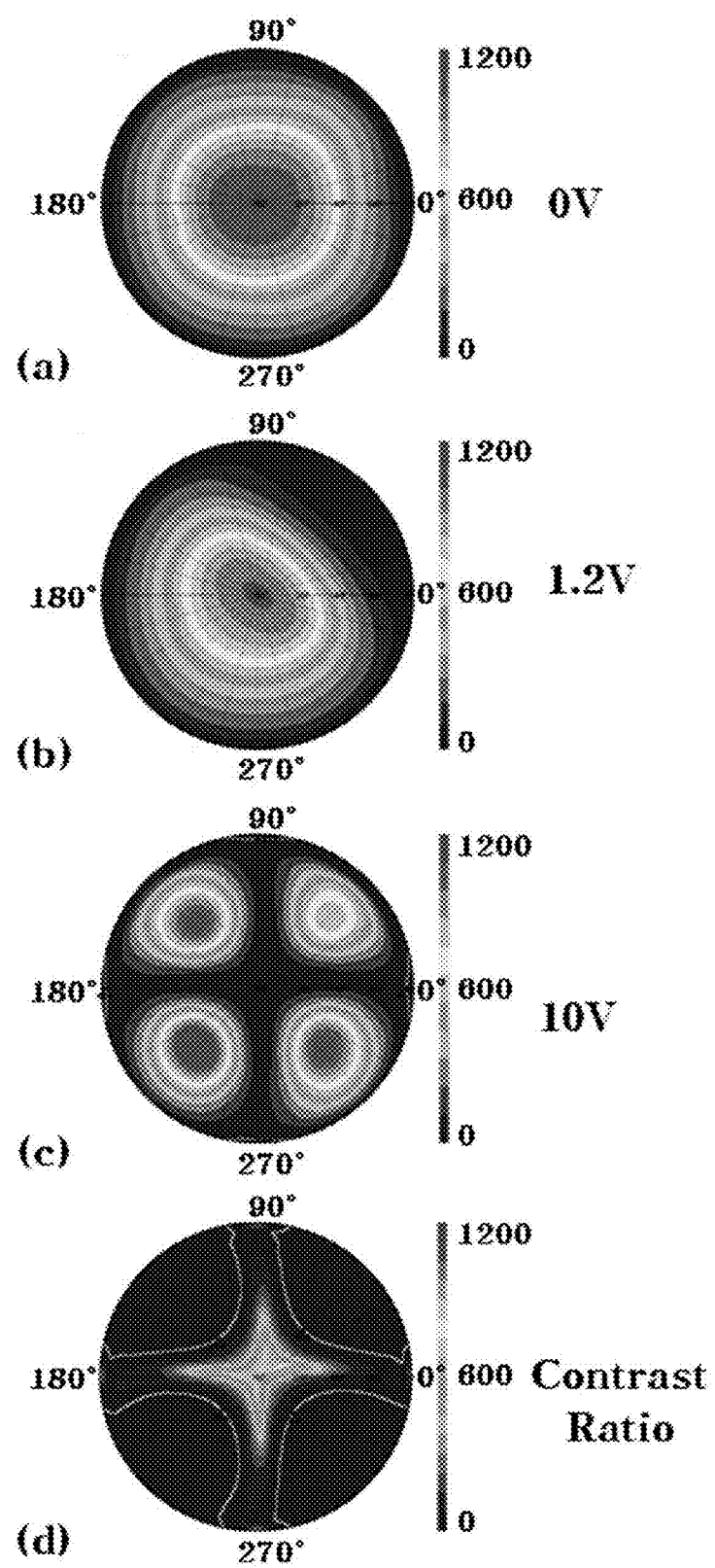
FIG. 10A and FIG. 10B are graphs showing estimation results of display characteristics of a multi-domain of a liquid crystal display according to an experimental example of the present invention.
Figure 10B:
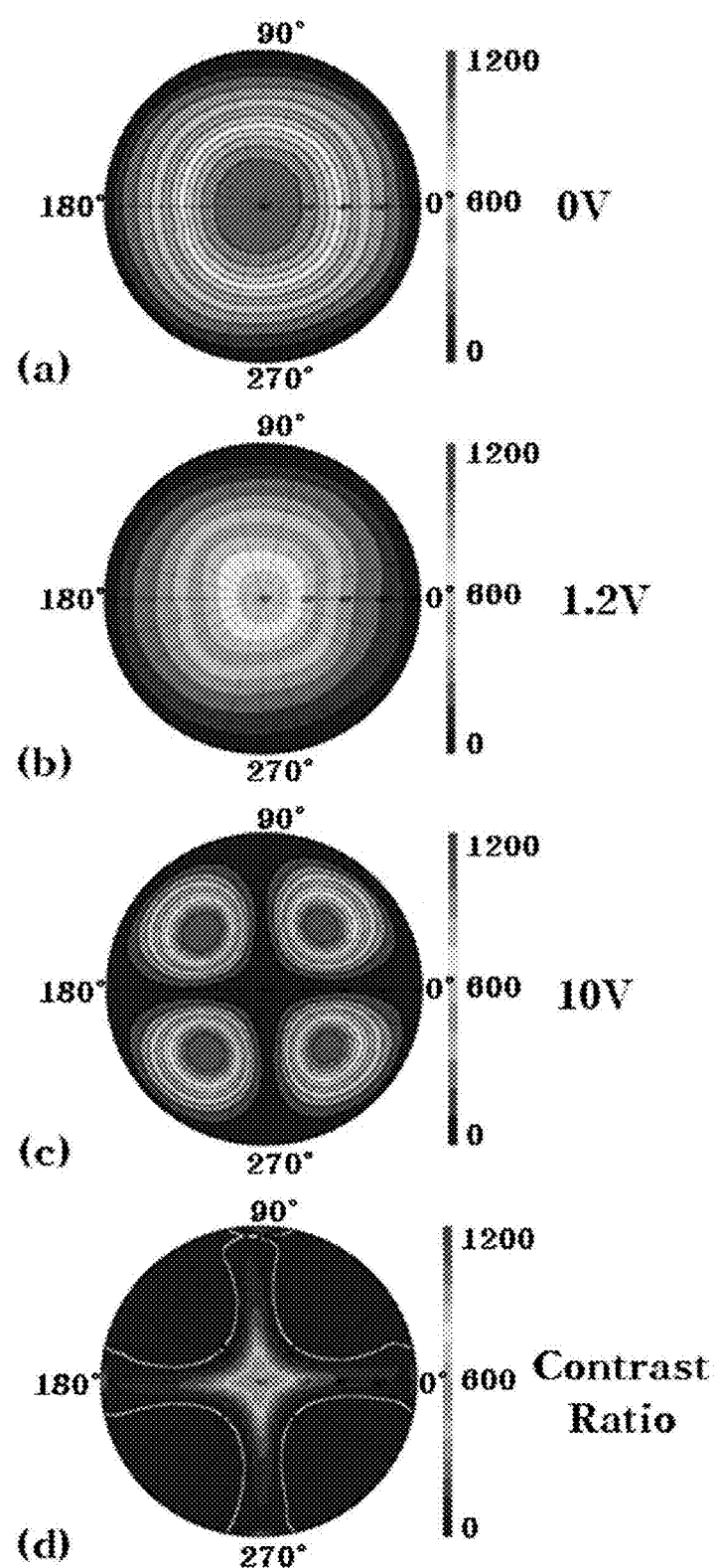

Next, display characteristics of a multi-domain of a liquid crystal display according to an experimental example of the present invention will be described with reference to FIG. 10A and FIG. 10B. FIG. 10A and FIG. 10B are graphs showing estimation results of display characteristics of a multi-domain of a liquid crystal display according to an experimental example of the present invention.

FIG. 10A shows the case in which the conventional horizontal alignment layer is used to form four domains in the liquid crystal display of the twisted nematic mode, and FIG. 10B shows the case of forming four domains in the liquid crystal display of the twisted nematic mode having the alignment base layer including the horizontal alignment layer and the vertical alignment layer, and the alignment control agent according to the exemplary embodiment of the present invention.

FIG. 10A and FIG. 10B (a), (b), and (c) show the luminance distribution of the cases in which the voltages applied to the liquid crystal layer are respectively 0V, 1.2V, and 10V, and (d) shows a contrast ratio distribution.

Referring to FIG. 10A and FIG. 10B, in the case of forming four domains in the liquid crystal display of the twisted nematic mode having the alignment base layer including the horizontal alignment layer and the vertical alignment layer, and the alignment control agent according to the exemplary embodiment of the present invention, compared with the case of forming four domains by using the conventional horizontal alignment layer in the liquid crystal display of the twisted nematic mode, it may be confirmed that four domains are symmetrical in the luminance distribution and the contrast ratio distribution. Accordingly, in the case of the liquid crystal display according to an exemplary embodiment of the present invention, the twisted nematic liquid crystal display having four domains with the direction symmetry in the whole gray range may be realized. Accordingly, a liquid crystal display having an excellent viewing angle in the whole gray range may be realized.

Figure 11A:
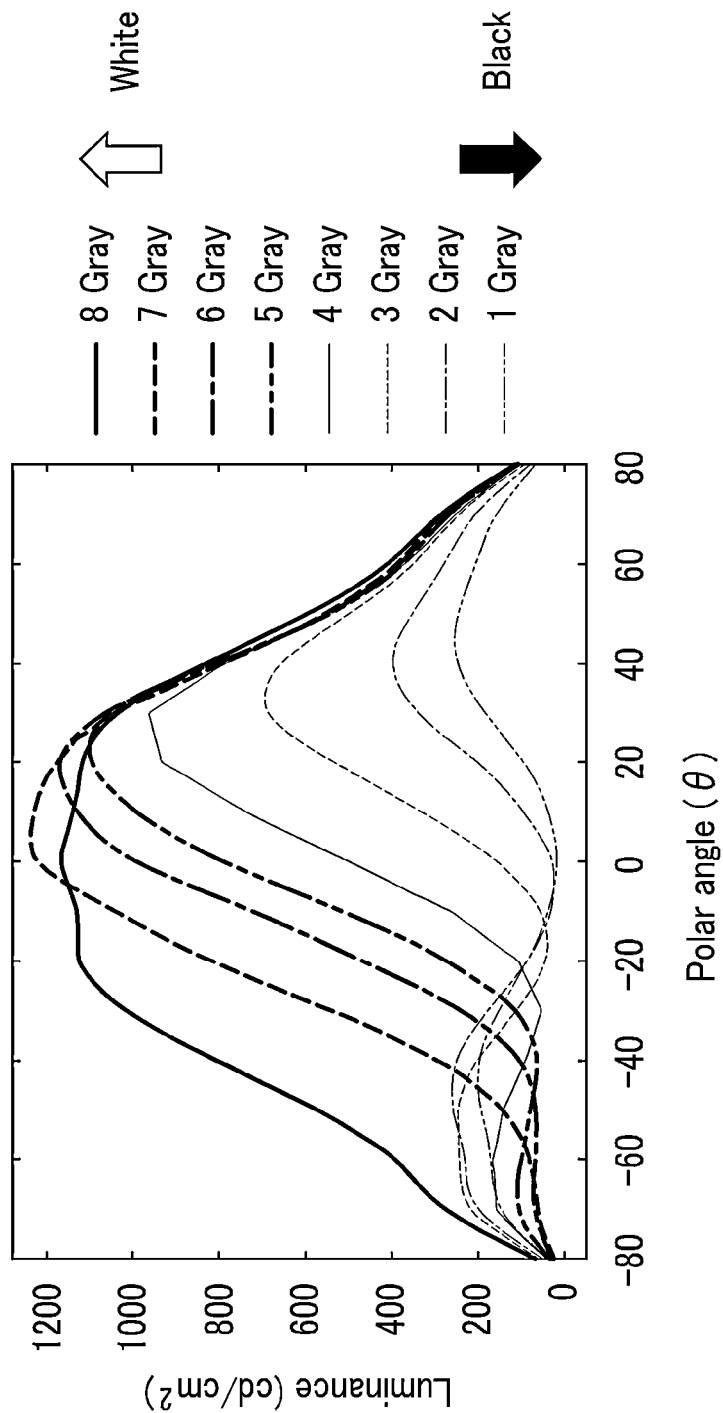
FIG. 11A and FIG. 11B are graphs showing transmittance results per gray according to positions of a liquid crystal display according to an experimental example of the present invention.
Figure 11B:
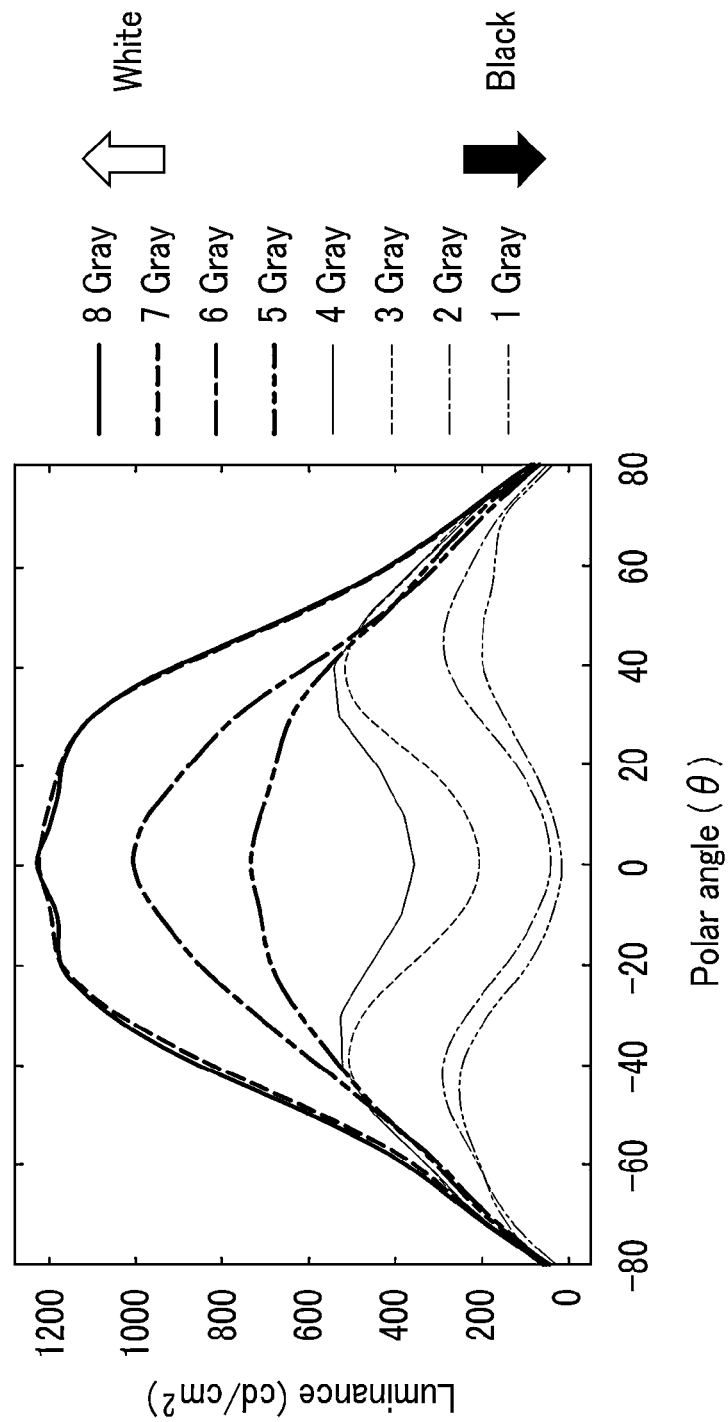

Next, display characteristics of a liquid crystal display according to an experimental example of the present invention will be described with reference to FIG. 11A and FIG. 11B. FIG. 11A and FIG. 11B are graphs showing a transmittance result per gray according to positions of a liquid crystal display according to an experimental example of the present invention.

FIG. 11A shows the case of using the conventional horizontal alignment layer, and FIG. 11B shows the case including the alignment control agent for the alignment layer including the horizontal alignment layer and the vertical alignment layer according to the exemplary embodiment of the present invention.

Referring to FIG. 11A, in the case of using the conventional horizontal alignment layer, the transmittance change according to the gray correctly appears in the range of less than about −50° of the polar angle according to the positions of the liquid crystal display, however gray scale inversion in which the transmittance according to the gray reversely appears in the range of more than the polar angle is generated. Referring to FIG. 11B, for the case including the alignment control agent for the alignment layer including the horizontal alignment layer and the vertical alignment layer according to the exemplary embodiment of the present invention, in the whole range of the polar angle, transmittance change according to the gray correctly appears without the gray scale inversion.

In this way, compared with the liquid crystal display of the general twisted nematic mode, in the case of the liquid crystal display according to an exemplary embodiment of the present invention, it may be confirmed that the viewing angle symmetry is improved and the gray scale inversion is improved.

Figure 12A:
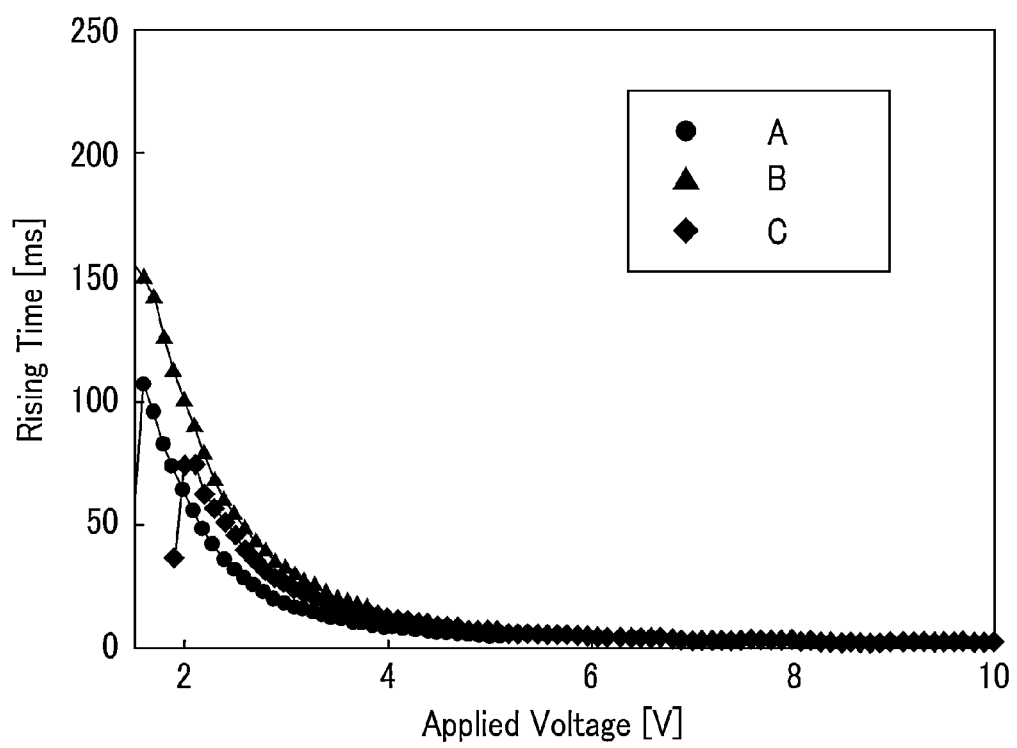
FIG. 12A to FIG. 12C are graphs showing response speed results of a liquid crystal display according to an experimental example of the present invention.
Figure 12B:
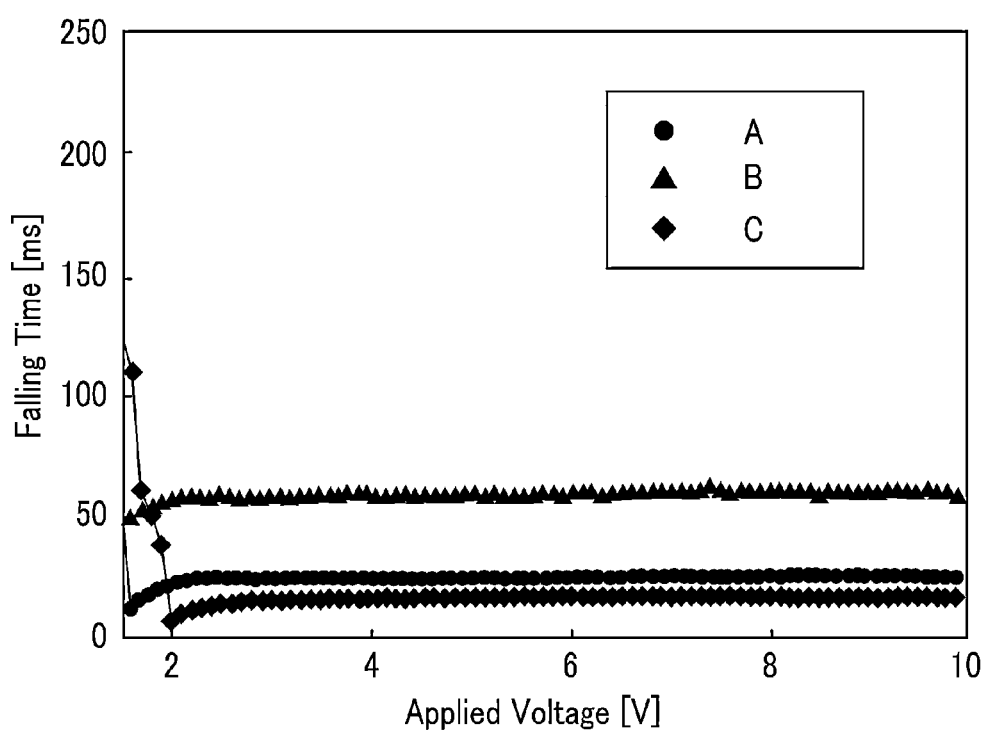
Figure 12C:
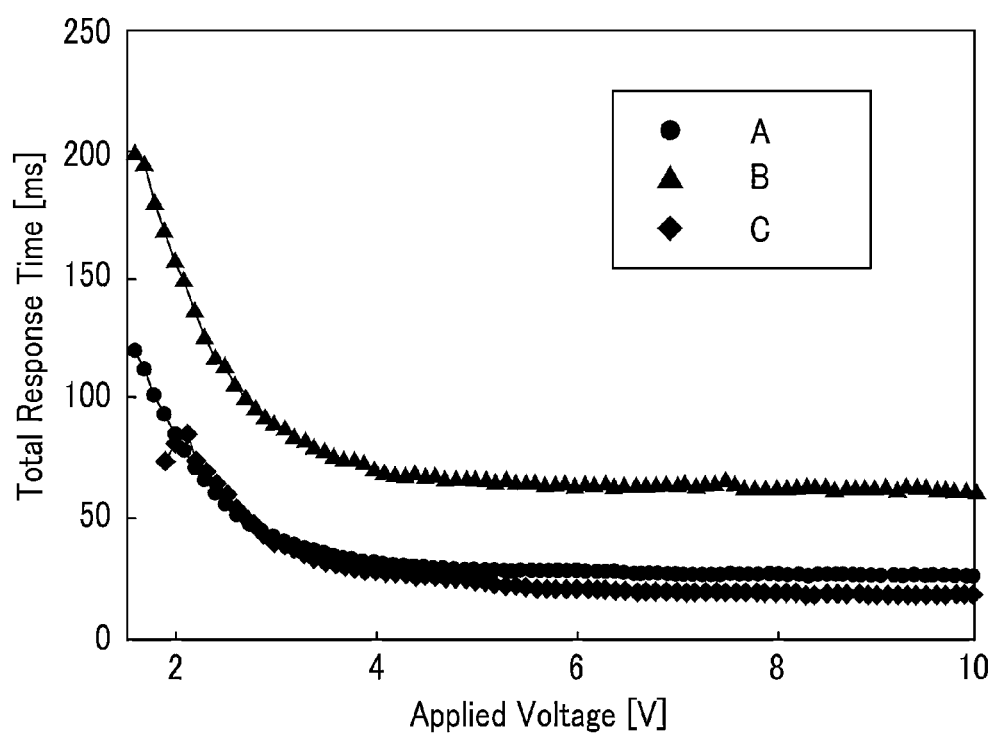

Next, a response speed result of a liquid crystal display according to an experimental example of the present invention will be described with reference to FIG. 12A to FIG. 12C. FIG. 12A to FIG. 12C are graphs showing response speed results of a liquid crystal display according to an experimental example of the present invention. FIG. 12A shows a rising time of the liquid crystal molecules, FIG. 12B shows a falling time of the liquid crystal molecules, and FIG. 12C shows a total response time of the liquid crystal molecules. In FIG. 12A to FIG. 12C, A is related to the liquid crystal display of the general twisted nematic mode, B is related to the liquid crystal display of the general multi-domain twisted nematic mode, and C is related to the multi-domain liquid crystal display according to an exemplary embodiment of the present invention.

Referring to FIG. 12A to FIG. 12C, compared with the liquid crystal displays of the general twisted nematic mode or the general multi-domain twisted nematic mode, in the case of the multi-domain liquid crystal display according to an exemplary embodiment of the present invention, the response speed is improved. In this way, in the liquid crystal display according to an exemplary embodiment of the present invention, the alignment control agent is included in the double alignment layers such that the response speed may be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | | | |
|---|---|---|---|
| 100: | lower display panel | 101a: | first alignment layer |
| 101b: | third alignment layer | 101c: | fifth alignment layer |
| 110: | first substrate | 120: | first alignment base layer |
| 130: | second alignment base layer | | |
| 140a: | first alignment control agent | | |
| 140b: | third alignment control agent | | |
| 140c: | fifth alignment control agent | | |
| 150: | fifth alignment base layer | 160: | seventh alignment base layer |
| 200: | upper display panel | 201a: | second alignment layer |
| 201b: | fourth alignment layer | 201c: | sixth alignment layer |
| 210: | second substrate | 220: | third alignment base layer |
| 230: | fourth alignment base layer | | |
| 240a: | second alignment control agent | | |
| 240b: | fourth alignment control agent | | |
| 240c: | sixth alignment control agent | | |
| 250: | sixth alignment base layer | 260: | eighth alignment base layer |
| 3: | liquid crystal layer | 31: | liquid crystal molecules |

What is claimed is:

1. A liquid crystal display comprising:
   a first substrate; and
   a first alignment layer including
   a first horizontal alignment base layer disposed on the first substrate,
   a first vertical alignment base layer disposed on the first horizontal alignment layer, and
   a first alignment control agent extended from inside of the first vertical alignment base layer.

2. The liquid crystal display of claim 1, wherein the first alignment layer is aligned in a plurality of directions.

3. The liquid crystal display of claim 1, wherein the first alignment control agent is formed by polymerizing a photo-polymerizable monomer or oligomer.

4. The liquid crystal display of claim 3, wherein the photo-polymerizable monomer or oligomer includes a reactive mesogen.

5. The liquid crystal display of claim 1, wherein
the first alignment layer includes a first region and a second region that are aligned in different directions.

6. The liquid crystal display of claim 5, wherein
the first region and the second region are aligned in opposite directions.

7. The liquid crystal display of claim 1, further comprising:
a second substrate facing the first substrate; and
a second alignment layer disposed on the second substrate and including
a second horizontal alignment base layer disposed on the second substrate,
a second vertical alignment base layer disposed on the second horizontal alignment base layer, and
a second alignment control agent extended from the second vertical alignment base layer; and
a liquid crystal layer interposed between the first substrate and the second substrate.

8. The liquid crystal display of claim 7, wherein
the first alignment control agent and the second alignment control agent are formed by polymerizing a photo-polymerizable monomer or oligomer.

9. The liquid crystal display of claim 8, wherein
the photo-polymerizable monomer or oligomer includes a reactive mesogen.

10. The liquid crystal display of claim 7, wherein
the liquid crystal layer is a twisted nematic liquid crystal layer.

11. The liquid crystal display of claim 7, wherein
the first alignment layer includes a first region and a second region that are aligned in opposite directions, and
the second alignment layer includes a third region and a fourth region that are aligned in opposite directions.

12. The liquid crystal display of claim 11, wherein
the alignment directions of the first region and the second region are perpendicular to the alignment directions of the third region and the fourth region.

13. A liquid crystal display comprising:
a first substrate; and
a first alignment layer disposed on the first substrate and including
a first alignment base layer disposed on the first substrate and formed by mixing a horizontal alignment material and a vertical alignment material and
a first alignment control agent extended from inside of the alignment base layer,
wherein the first alignment control agent is formed by polymerizing a photo-polymerizable monomer or oligomer.

14. The liquid crystal display of claim 13, wherein
the first alignment layer is aligned in a plurality of directions.

15. The liquid crystal display of claim 13, wherein
the first alignment layer includes a first region and a second region that are aligned in different directions.

16. The liquid crystal display of claim 15, wherein
the first region and the second region are aligned in opposite directions.

17. The liquid crystal display of claim 13, further comprising:
a second substrate facing the first substrate;
a second alignment layer disposed on the second substrate and including
a second alignment base layer disposed on the second substrate and including
a horizontal alignment material and a vertical alignment material and
a second alignment control agent extended from the second alignment base layer; and
a liquid crystal layer interposed between the first substrate and the second substrate.

18. The liquid crystal display of claim 17, wherein
the first alignment layer and the second alignment layer are aligned in a plurality of directions.

19. The liquid crystal display of claim 17, wherein
the first alignment control agent and the second alignment control agent are formed by polymerizing a photo-polymerizable monomer or oligomer.

20. The liquid crystal display of claim 19, wherein
the photo-polymerizable monomer or oligomer includes a reactive mesogen.

21. The liquid crystal display of claim 17, wherein
the liquid crystal layer is a twisted nematic liquid crystal layer.

22. The liquid crystal display of claim 17, wherein
the first alignment layer includes a first region and a second region that are aligned in opposite directions, and
the second alignment layer includes a third region and a fourth region that are aligned in opposite directions.

23. The liquid crystal display of claim 22, wherein
the alignment directions of the first region and the second region are perpendicular to the alignment directions of the third region and the fourth region.

24. A method for manufacturing a liquid crystal display comprising:
depositing a first alignment material layer including a horizontal alignment material, a vertical alignment material, and an alignment control material on a first substrate;
aligning the first alignment material layer to form a first alignment base layer to have a plurality of domains; and
exposing the first alignment material layer to a light to polymerize the alignment control material thereby forming a first alignment control agent,
wherein the first alignment control agent includes a plurality of branches extended from the first alignment base layer.

25. The method of claim 24, further comprising:
depositing a second alignment material layer including a horizontal alignment material, a vertical alignment material, and an alignment control material on a second substrate;
aligning the second alignment material layer to form a second alignment base layer to have a plurality of domains; and
exposing the second alignment material layer to a light to polymerize the alignment control material thereby forming a second alignment control agent,
wherein the second alignment control agent includes a plurality of branches extended from the second alignment base layer.

26. The method of claim 25, further comprising:
assembling the first substrate including the first alignment base layer and the first alignment control agent and the second substrate including the second alignment base layer and the second alignment control agent to face each other; and
injecting a liquid crystal layer between the first substrate and the second substrate.

27. The method of claim 26, wherein
the liquid crystal layer is a twisted nematic liquid crystal layer.

28. The method of claim 25, wherein
the first alignment control agent and the second alignment control agent are formed by polymerizing a photo-polymerizable monomer or oligomer.

29. The method of claim 28, wherein
the photo-polymerizable monomer or oligomer includes a reactive mesogen.

30. The method of claim 25, wherein
the first alignment base layer includes a first region and a second region that are aligned in opposite directions, and
the second alignment base layer includes a third region and a fourth region that are aligned in opposite directions.

31. The method of claim 30, wherein
the alignment directions of the first region and the second region are perpendicular to the alignment directions of the third region and the fourth region.

32. The method of claim 25, wherein
the forming of the first alignment base layer and the aligning of the second alignment base layer include rubbing the first alignment material layer and the second alignment material layer.

33. A method for manufacturing a liquid crystal display comprising:
depositing a first alignment material layer including a horizontal alignment material, a vertical alignment material, and an alignment control material on a first substrate;
aligning the first alignment material layer to form a first alignment base layer to have a plurality of domains; and
depositing a second alignment material layer including a horizontal alignment material, a vertical alignment material, and an alignment control material on a second substrate;
aligning the second alignment material layer to form a second alignment base layer to have a plurality of domains;
assembling the first substrate and the second substrate to face each other; and
exposing the first alignment material layer and the second alignment material layer to a light in a state in which an electric field is applied to a liquid crystal layer to form a first alignment control agent disposed on the first alignment base layer and a second alignment control agent disposed on the second alignment base layer,
wherein the first alignment control agent includes a plurality of branches extended from the first alignment base layer, and
the second alignment control agent includes a plurality of branches extended from the second alignment base layer.

34. The method of claim 33, wherein
the first alignment control agent and the second alignment control agent are formed by polymerizing a photo-polymerizable monomer or oligomer.

35. The method of claim 34, wherein
the photo-polymerizable monomer or oligomer includes a reactive mesogen.

36. The method of claim 33, wherein
the first alignment base layer includes a first region and a second region that are aligned in opposite directions, and
the second alignment base layer includes a third region and a fourth region that are aligned in opposite directions.

37. The method of claim 36, wherein
the alignment directions of the first region and the second region are perpendicular to the alignment directions of the third region and the fourth region.

38. The method of claim 33, further comprising:
assembling the first substrate and the second substrate to face each other; and
injecting a liquid crystal layer between the first substrate and the second substrate.

39. The method of claim 38, wherein
the liquid crystal layer is a twisted nematic liquid crystal layer.

40. The method of claim 33, further comprising
injecting a liquid crystal layer between the first substrate and the second substrate after forming the first alignment control agent and the second alignment control agent.

41. The method of claim 40, wherein
the liquid crystal layer is a twisted nematic liquid crystal layer.

42. The method of claim 33, wherein
the forming of the first alignment base layer and the second alignment base layer includes rubbing the first alignment material layer and the second alignment material layer.

* * * * *